United States Patent [19]

Berfield et al.

[11] Patent Number: 4,609,387
[45] Date of Patent: Sep. 2, 1986

[54] COLLAPSIBLE SUPPORT CAGE FOR VACUUM CLEANER FILTER

[75] Inventors: Robert C. Berfield, Jersey Shore; Robert L. Crevling, Williamsport, both of Pa.

[73] Assignee: Shop-Vac Corporation, Williamsport, Pa.

[21] Appl. No.: 687,512

[22] Filed: Dec. 28, 1984

[51] Int. Cl.⁴ .............................................. B01D 46/02
[52] U.S. Cl. ....................................... 55/320; 55/379; 55/493; 55/508; 55/DIG. 3
[58] Field of Search .................................. 55/318–323, 55/378, 379, 493, 506, DIG. 3, 508

[56] References Cited

U.S. PATENT DOCUMENTS

| | | | |
|---|---|---|---|
| 2,349,043 | 5/1944 | Hyland | 55/379 X |
| 3,740,933 | 6/1973 | Hollowell | 55/429 |
| 4,413,800 | 11/1983 | Kelson | 248/99 |
| 4,435,877 | 3/1984 | Berfield | 55/276 X |

FOREIGN PATENT DOCUMENTS 0020176 of 1912 United Kingdom .................. 55/379

*Primary Examiner*—Charles Hart
*Attorney, Agent, or Firm*—Ostrolenk, Faber, Gerb & Soffen

[57] ABSTRACT

A by-pass type wet/dry vacuum cleaner includes a dirt accumulating tank that is free-standing on one end thereof and open at the other end. A removable lid provided to close the other end mounts an inner cage that supports a primary filter cuff and also mounts an outer cage that prevents a primary filter blanket from being drawn into contact with the secondary filter and thereby substantially block air flow through the latter. The outer cage is constructed of two U-shaped formed spring wire element that are pivotably mounted to the inner surface of the lid so as to be movable between erected and collapsed positions without utilizing tools and without dismounting either element from the lid. Cooperating detent formations on the elements maintains them in their erected positions.

10 Claims, 8 Drawing Figures

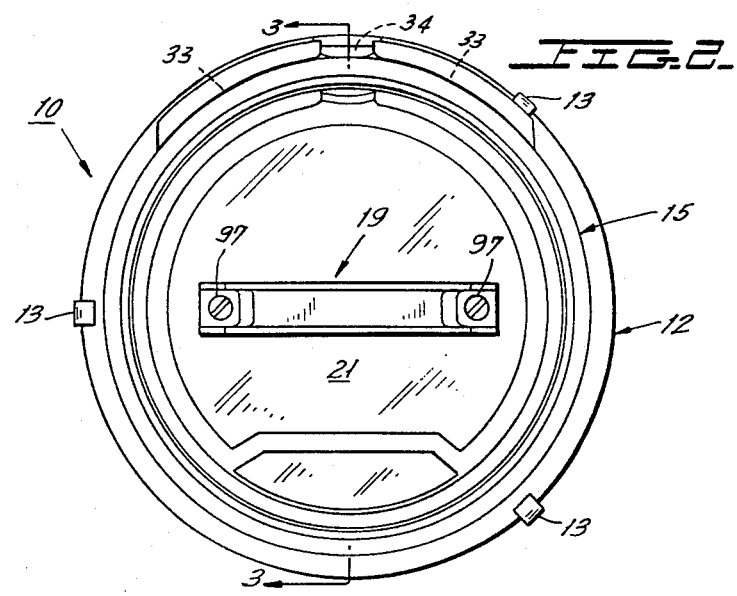
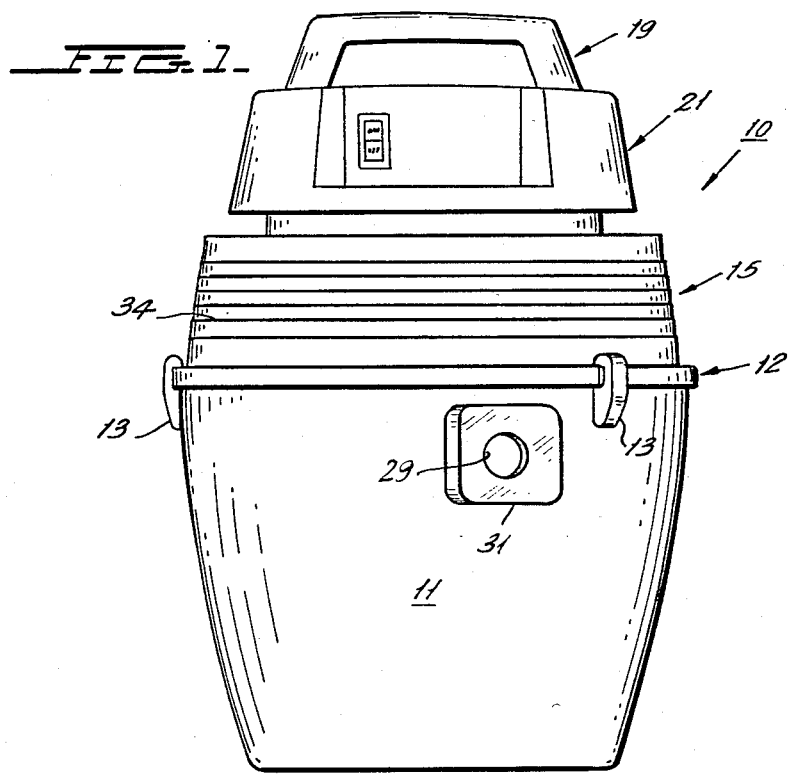

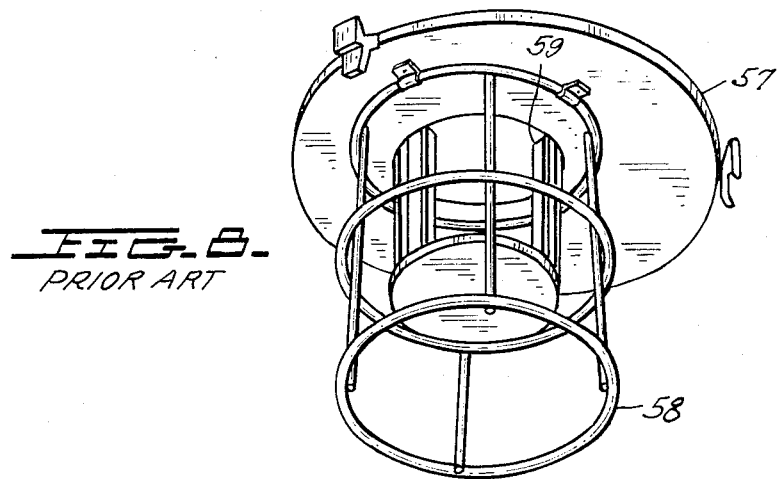
_FIG._8_
PRIOR ART
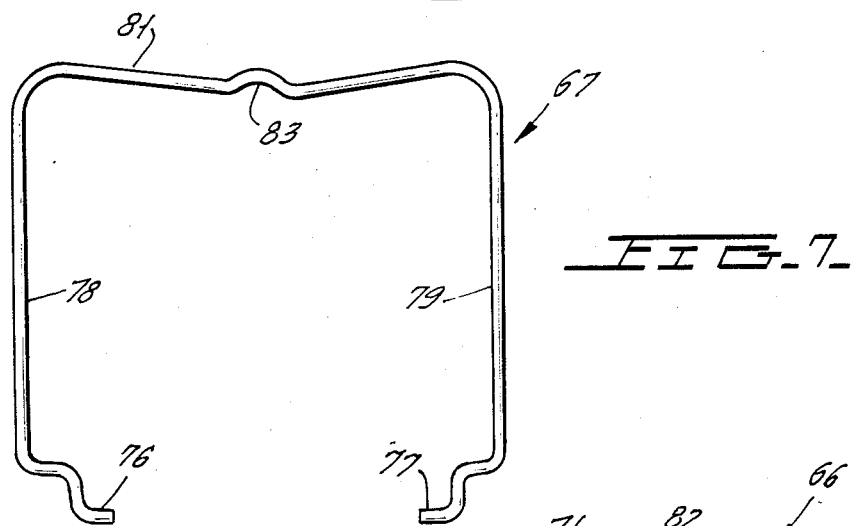
_FIG._7_
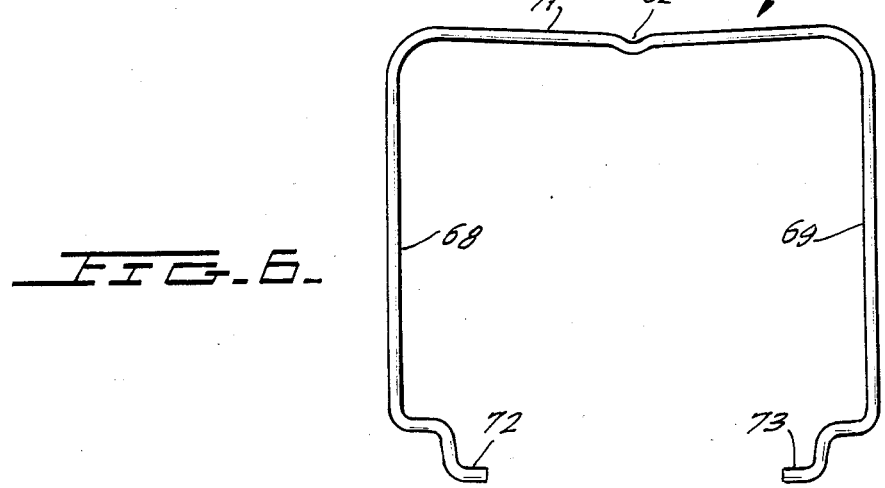
_FIG._6_

COLLAPSIBLE SUPPORT CAGE FOR VACUUM CLEANER FILTER

BACKGROUND OF THE INVENTION

This invention relates to tank-type electric motor-operated vacuum cleaners, and more particularly relates to a collapsible frame for limiting downstream movement of the primary or upstream filter in a two element air filtering system of a so-called wet/dry vacuum cleaner.

In many tank type wet/dry vacuum cleaners a cage which extends into the dirt receiving cannister is often provided as a support for a tubular air filter element or a wrap of air filtering material. Such a construction is illustrated in U.S. Pat. No. 4,185,974, issued Jan. 29, 1980 to K. R. Hrister, for an "Integral Filter Cage and Lid For Cannister Type Vacuum Cleaner". While a single air filter of this type is sufficient for most operating conditions, under severe conditions the limited filtering area results in clogging of the filter after only a short period of operation so that it must be cleaned or changed very often. To extend the operating period between filter cleaning and/or replacement and also to improve air cleaning, the prior art approach has been to add a second relatively large filter that is constituted by a blanket of porous material inserted into the dirt accumulating tank. In order to prevent the added or primary filter from being drawn into contact with the original or secondary filter and blocking air flow thereto, the prior art has also provided a second filter cage that is interposed between the primary and secondary filters.

In prior art constructions, the size and shape of the second cage has been such that it is necessary to dismount same in order to gain access to the first filter for replacement or cleaning thereof.

In one prior art construction, the second filter cage is placed into the primary filter blanket after the latter has been placed over in the tank opening. The lid is then placed over the second cage, primary filter and tank. This construction has the disadvantage of causing the user to remove the second cage each time the tank is emptied, and since the second cage is not attached, it is subject to loss and damage when separated from the unit.

In another prior art construction, the second cage is snap connected to the lid and is removed by using enough force to overcome the resilience of the snaps. This construction has the advantage of staying attached to the lid when the tank is being emptied. However, it must be removed from the lid to change or clean the secondary filter. But, once removed, it has the same disadvantage listed above. In a further prior art construction, the second cage is attached to the lid with screws or the like. Obviously, this is the least desirable since the second cage must be separated from the unit to gain access to the secondary filter and tools are required for such operation.

BRIEF DESCRIPTION OF A PREFERRED EMBODIMENT

To alleviate the aforesaid inconvenience of prior art constructions, the instant invention provides a collapsible construction for the second filter. This construction is such that no tools are required and when the cage elements are collapsed, they are still secured to the removable lid of the dirt accumulating tank.

Accordingly, the primary object of the instant invention is to provide a novel construction for the outer cage in a two filter air cleaning system of a tank-type vacuum cleaner.

Another object is to provide a novel cage of this type that is constructed to permit ready access to the inner or secondary filter.

Still another object is to provide a novel cage of this kind that is convenient to collapse and to erect.

A further object is to provide a novel cage of this type that is collapsible and erectable without the utilization of tools.

A still further object is to provide a novel cage of this type in which the elements thereof when in collapsed position remain mounted to the removable lid of the dirt accumulating tank.

These objects as well as other objects of this invention shall become readily apparent after reading the following description of the accompanying drawings.

BRIEF DESCRIPTION OF THE DRAWINGS

FIG. 1 is a side elevation of a tank-type vacuum cleaner having the instant invention incorporated therein;

FIG. 2 is a plan view of the vacuum cleaner of FIG. 1;

In FIG. 4 the elements of the outer filter cage are erected, and in FIG. 5 these elements are separated from one another.

FIG. 6 is a side elevation of one of the elements that forms the cage;

FIG. 7 is a side elevation of the other element that forms the outer cage;

FIG. 8 is a perspective showing a prior art construction of two filter supporting cages mounted to a tank lid.

DETAILED DESCRIPTION OF THE DRAWINGS

Figure 3:
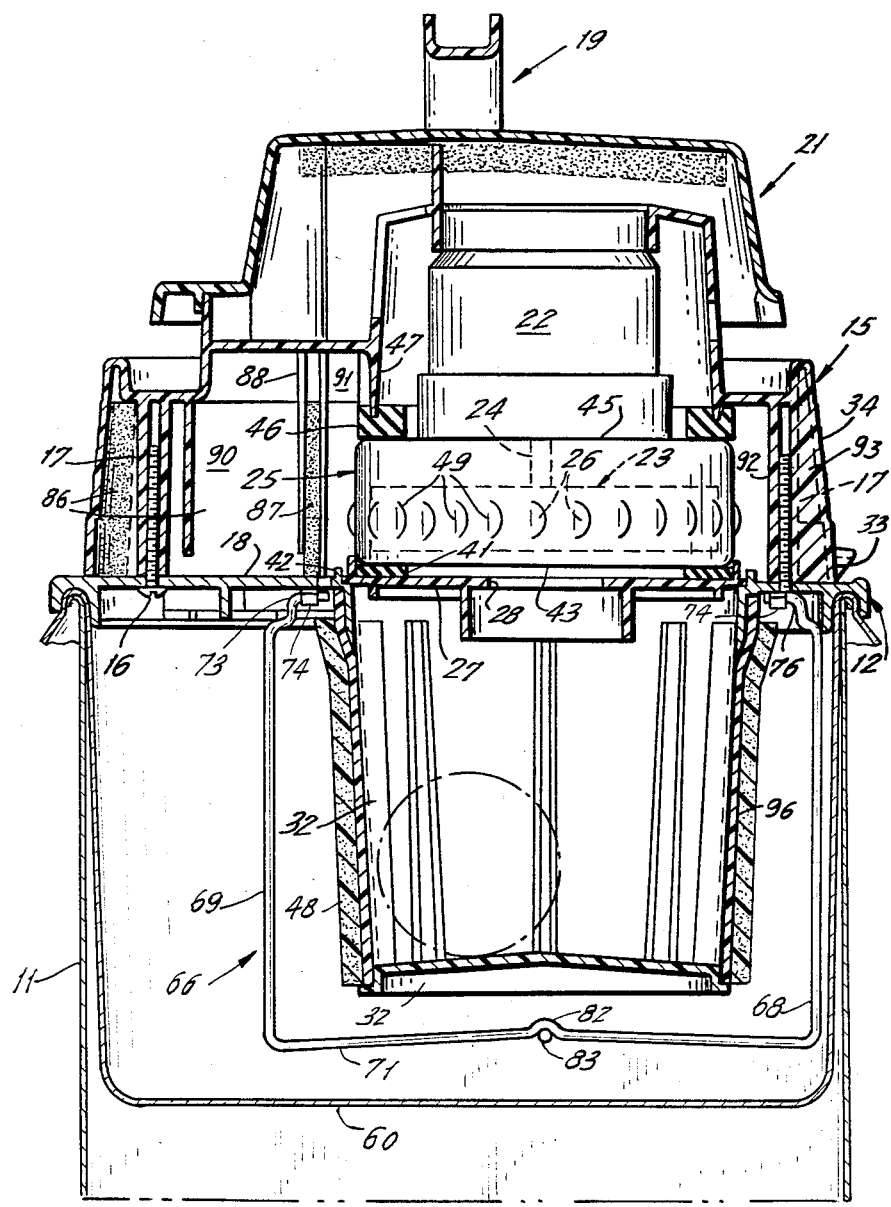
FIG. 3 is a cross-section taken through line 3—3 of FIG. 2 looking in the direction of arrows 3—3, with the bottom portion of the collecting tank removed.

Now referring to the Figures. Vacuum cleaner 10 includes tank 11 that is free-standing on its lower end and is provided with three buckle-type clamps 13 removably secure lid 12 over the open top of tank 11. Screws 16 retain molded plastic insulating motor housing 15 in operative position on upper surface 18 of lid 12 by extending through clearance apertures in the latter and being threadably received within central bores in six posts 17 formed integrally with housing 15. Two screws 14 extend through clearance apertures at opposite ends of molded plastic handle 19, extend through clearance apertures in the top of molded plastic insulating cover 21 and are threadably received in upwardly facing bores (not shown) of housing 15 to secure handle 19 and hood 21 to motor housing 15 in the operative positions shown in FIGS. 1 and 2.

Disposed within housing 15 and positioned above lid 12 is an assembly that includes electric motor 22, pancake type fan impeller 23 keyed to output shaft 24 of motor 22, and shallow round fan housing 25 which operatively supports motor 22 and impeller 23. The round sidewall of housing 25 is provided with a plurality of louvered apertures 26 through which air is driven from housing 25 by impeller 23. The outer portion of lid 12 is constructed of metal and defines an off center circular aperture, most of which is covered by molded plastic insert 27. The latter is provided with central aperture 28 aligned with a central aperture (not shown) in the lower surfaces of housing 25 at the center thereof.

In a manner well known to the art, rotation of impeller 23 by motor 22 draws working air into tank 11 at the side thereof though entrance aperture 29 in hose fitting 31, through blanket 60, constituting a primary filter through filter 48 on the outside of circular cage 32 extending downward from lid 12, through lid aperture 28 and the aperture aligned therewith in the bottom wall of housing 25 to the central region of impeller 23. The latter then directs this working air outward (sideways) through housing aperture 26, from which this air is redirected by louvres 49 in front of apertures 26 to flow generally tangentially, and finally sideways though exhaust openings 33, 33, at side 34 of housing 15 where the latter meets lid 12, after expanding within housing 15 as explained in U.S. Pat. No. 4,435,877 issued Mar. 13, 1984 to R. C. Berfield for a Noise Reducing Means For Vacuum Cleaner.

Filter blanket 60 is a sheet of open cell, flexible material whose periphery is clamped between lid 12 and the upper edge of tank 11. Within tank 11 blanket 60 drapes downward below collapsible outer cage 65 wherein tubular filter 48 and its supporting inner cage 32 are disposed. As seen in FIG. 8 which illustrates a typical prior art construction for support units of a dual filtering system. Such construction employs an inner cage 59 disposed within an outer cage 58 with both cages 58 and 59 being secured to tank lid 57 and extending downward therefrom. In order to gain access to the secondary filter element (not shown) supported by inner cage 59, it was necessary to disconnect rigid outer cage 58 from lid 57, the latter operation requiring one or more tools.

In contrast, outer cage 65 of the instant invention is a collapsible structure that facilitates access to filter cuff 48 for cleaning or replacement thereof without the necessity of dismounting outer cage 65 from lid 12. More particularly, outer cage 65 consists of two generally U-shaped resilient formed wire elements. Element 66 includes generally parallel arms 68, 69 that extend from opposite ends of web 71. The free ends of arms 68, 69 are stepped inwardly to form aligned pivots 72, 73, respectively, that are received by pivot recesses in two of the four brackets 74 secured to the lower surface of lid 12.

Figure 4:
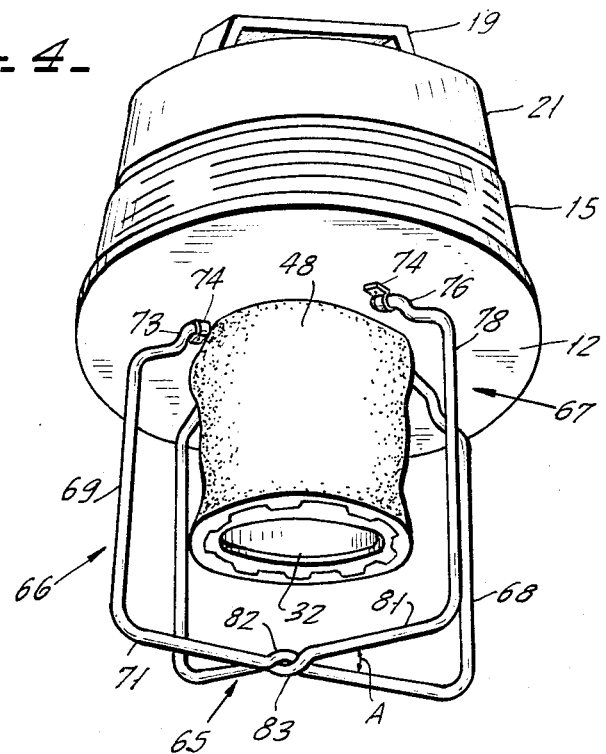
FIGS. 4 and 5 are perspectives of the tank lid and the air filter supporting elements mounted thereto, looking toward the bottom of the tank lid.
Figure 5:
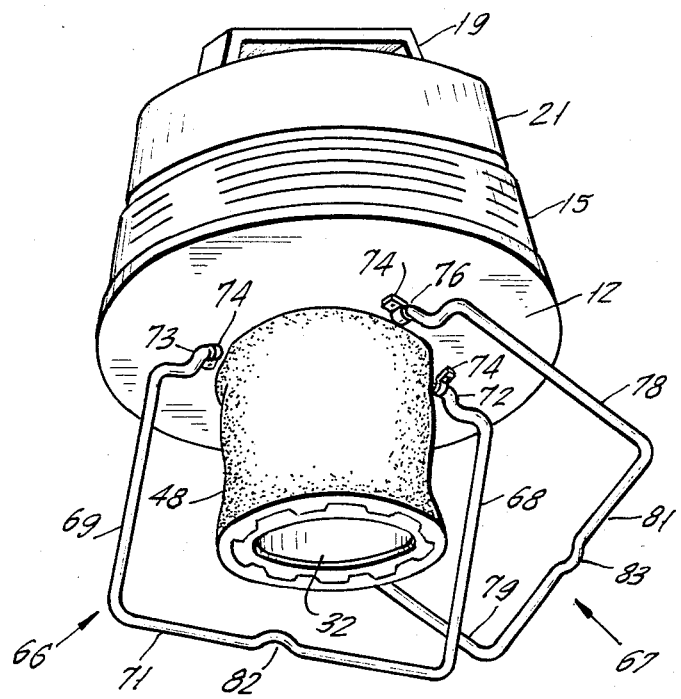

The inwardly extending pivot formations 76, 77 of the other cage element 67 are received by pivot recesses in the other two brackets 74. Pivot formations 76, 77 are at the free ends of the respective generally parallel arms 78, 79 of element 67. Arms 78, 79 extend from opposite ends of web 81. With cage 65 erected, elements 66, 67 thereof are disposed in intersecting planes that are essentially perpendicular to the underside of lid 12. The angle A (FIG. 4) between these intersecting planes is in the range of approximately 90 degrees plus or minus 30 degrees. Elements 66, 67 are maintained in this position by a detent means in the form of cooperating formations 82, 83 located at the centers of the respective webs 71, 72, with formation 82 defining a depression that receives web 81 and formation 83 defining a depression that receives web 71. Cage elements 66, 67 are sufficiently resilient to permit deflections that will enable webs 71, 81 to be readily withdrawn from the holding depressions formed by detent formations 82, 83. Outer cage 65 of the instant invention perform the same function as outer cage 58 of the prior art. That is, both of these outer cages 65, 58 prevent outer filter blanket 60 from being moved by the working air flow, which rotating fan 23 produces, into contact with inner tubular filter 48. In the event outer or primary filter 60 were to be drawn into contact with inner or secondary filter 48, there would be a marked increase in resistance to air flow through accumulating tank 11 to the point where the reduced vacuum at inlet 29 would be insufficient to obtain acceptable cleaning action.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A vacuum cleaner including:
a tank having a top opening,
fan means for generating a flow of working air along a path that extends through said tank,
a lid removably secured to said tank and disposed over said top opening, said lid having an aperture located along said path and constituting an exit through which said working air is drawn from said tank,
a frame mounted on said lid, a first filter supported by said frame and disposed to have said working air flow therethrough,
a second filter disposed within said tank, a collapsible frame structure mounted on said lid and including a plurality of cooperating elements movable between erected and collapsed portions:
with said elements in their said erected positions, said frame structure being operatively positioned to prevent said working air from moving said second filter into contact with said first filter;
with said elements in their said collapsed position remaining mounted on said lid, said first filter being accessible for removal and replacement while said frame remains mounted on said lid; and
and detent means for releasably maintaining said cooperating elements in their erected positions.

2. A vacuum cleaner as set forth in claim 1 in which a first and second of said cooperating elements are each generally U-shaped with a web and arms that extend from opposite ends of said web, said arms having their other ends remote from said web connected to said lid.

3. A vacuum cleaner as set forth in claim 2 in which there are pivot connections at said other ends which permit relative movement between each of said cooperating elements and said lid.

4. A vacuum cleaner as set forth in claim 3 in which said cooperating elements are movable independently of each other relative to said lid.

5. A vacuum cleaner as set forth in claim 1 in which the detent means include cooperating formations on said webs each comprising a resilient wire.

6. A vacuum cleaner as set forth in claim 1 in which said tank includes an upper edge defining a boundary for said top opening, a porous blanket draped over said top edge and constituting said second filter, portions of said blanket being clamped between said top edge and said lid.

7. A vacuum cleaner as set forth in claim 1 in which said tank also includes a side opening disposed along said path and constituting an entrance through which particles picked up by said working air enter said tank upstream of said second filter.

8. A vacuum cleaner as set forth in claim 2 in which the first and second elements in their said erected positions are disposed in intersecting planes that are generally perpendicular to said lid and at an angle to each other ranging from 60 degrees to 120 degrees.

9. A vacuum cleaner as set forth in claim 1 also including detent means for releasably maintaining said cooperating elements in their said erected positions, said detent means including cooperating first and second formations on the webs of the respective first and second elements.

10. A vacuum cleaner as set forth in claim 9 in which the first and second formations define respective first and second depressions that receive the respective webs of the second and first elements.

* * * * *